(12) United States Patent
Jung et al.

(10) Patent No.: US 9,408,127 B2
(45) Date of Patent: Aug. 2, 2016

(54) METHOD FOR RE-SELECTING CELL IN WIRELESS COMMUNICATION SYSTEM, AND APPARATUS THEREFOR

(71) Applicant: LG Electronics Inc., Seoul (KR)

(72) Inventors: Sung Hoon Jung, Anyang-si (KR); Sung Jun Park, Anyang-si (KR); Jae Wook Lee, Anyang-si (KR); Young Dae Lee, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/374,476

(22) PCT Filed: Jan. 29, 2013

(86) PCT No.: PCT/KR2013/000714
§ 371 (c)(1),
(2) Date: Jul. 24, 2014

(87) PCT Pub. No.: WO2013/112033
PCT Pub. Date: Aug. 1, 2013

(65) Prior Publication Data
US 2015/0011216 A1 Jan. 8, 2015

Related U.S. Application Data

(60) Provisional application No. 61/591,963, filed on Jan. 29, 2012.

(51) Int. Cl.
*H04W 36/00* (2009.01)
*H04W 36/16* (2009.01)
*H04W 48/16* (2009.01)

(52) U.S. Cl.
CPC ........ *H04W 36/165* (2013.01); *H04W 36/0072* (2013.01); *H04W 48/16* (2013.01)

(58) Field of Classification Search
CPC .............. H04W 36/00; H04W 36/165; H04W 36/0072
USPC .......................................... 455/436; 370/338
See application file for complete search history.

(56) References Cited

U.S. PATENT DOCUMENTS

| 2010/0027510 A1* | 2/2010 | Balasubramanian . H04W 48/18 370/332 |
| 2010/0113010 A1* | 5/2010 | Tenny ..................... H04L 12/66 455/423 |
| 2011/0053596 A1* | 3/2011 | Wohlert ................ H04W 36/04 455/436 |

FOREIGN PATENT DOCUMENTS

| KR | 1020100046187 A | 5/2010 |
| KR | 10-2011-0036959 | 4/2011 |

(Continued)

OTHER PUBLICATIONS

3rd Generation Partnership Project; Technical Specification Group Radio Access Network; Evolved Universal Terrestrial Radio Access (E-UTRA); User Equipment (UE) procedures in Idle mode (Release 10); 3GPP TS 36.304 V10.4.0 (Dec. 2011).

(Continued)

*Primary Examiner* — Marcos Batista
(74) *Attorney, Agent, or Firm* — Dentons US LLP

(57) ABSTRACT

Provided is a method for re-selecting a cell by a terminal in a wireless communication system. The method comprises: determining whether conditions for suspending application of autonomous priority handling are satisfied, the autonomous priority handling applying a priority order of a terminal which is different from a frequency priority order configured from a network for a particular frequency; if conditions for suspension are satisfied, re-selecting a cell by applying the configured priority order from the network to the particular frequency; determining whether start conditions for applying the autonomous priority order are satisfied; and if the start conditions are satisfied, re-selecting a cell by applying the priority order of the terminal for the particular frequency.

10 Claims, 11 Drawing Sheets

(56) References Cited

FOREIGN PATENT DOCUMENTS

| KR | 10-2011-0102418 | 9/2011 |
| KR | 10-2012-0004530 | 1/2012 |
| KR | 10-2012-0004554 | 1/2012 |
| WO | 2009/132246 | 10/2009 |
| WO | 2010/031258 | 3/2010 |
| WO | 2010/078747 | 7/2010 |
| WO | 2010/123876 | 10/2010 |

OTHER PUBLICATIONS

CATT: "MBMS Continuity and the Relationship with CSG", 3GPP TSG RAN WG2 Meeting #75bis, R2-115113, Oct. 10-14, 2011.

* cited by examiner

METHOD FOR RE-SELECTING CELL IN WIRELESS COMMUNICATION SYSTEM, AND APPARATUS THEREFOR

This application is a 35 USC §371 National Stage entry of International Application No. PCT/KR2013/000714 filed on Jan. 29, 2013 and claims priority to U.S. Provisional Application No. 61/591,963, filed Jan. 29, 2012 all of which are incorporated by reference in their entirety herein.

BACKGROUND OF THE INVENTION

1. Field of the Invention

The present invention relates to wireless communication and, more particularly, to a method for re-selecting a cell in a wireless communication system and an apparatus therefor.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A micro-cell, a femto cell, a pico cell, or the like, having a small service area may be installed at a particular location of a macro-cell having wide coverage. This is called a heterogeneous network.

A user equipment (UE) represented by a mobile device moves, so a cell that degrades quality of a currently provided service or a cell that provides a better service may be discovered. Due to this issue, a UE may move to a new cell, which is called conducting of UE mobility.

In order to conduct mobility, a UE continuously perform measurement on a serving cell and an adjacent cell. When measurement results satisfy conditions for conducting mobility, the UE may receive an instruction from the serving cell or may directly conduct mobility.

A particular type of cell may provide a particular service or permit only a particular subscriber to access, and provide a service. In this case, a UE may maintain connection to a cell that provides a corresponding service or a cell that allows for accessing, thus being provided with an enhanced service. To this end, cell re-selection priority of a particular cell may be adjusted to induce a UE to access a corresponding cell or limit UE accessing. For example, an autonomous priority handling technique may be used.

When UEs are induced to access a particular cell or limit UE accessing to a particular cell through adjustment of priority such as autonomous priority handling, UEs may access some of cells through cell re-selection, and in this case, the number of UEs which have accessed some cells may be overloaded, possibly causing a problem in terms of optimization of a network environment. Thus, a cell re-selection method for enhancing and optimizing network performance is required.

SUMMARY OF THE INVENTION

The present invention provides a method for re-selecting a cell in a wireless communication system and an apparatus therefor.

In an aspect, a method for re-selecting a cell by a user equipment (UE) in a wireless communication system is provided. The method includes: determining whether conditions for suspending application of autonomous priority handling are met, the autonomous priority handling applying priority of a UE and being differentiated from frequency priority set by a network for a particular frequency; when the conditions for suspension are met, re-selecting a cell by applying the frequency priority set by the network to the particular frequency; determining whether conditions for resuming application of autonomous priority handling are met; and when the conditions for resuming application of autonomous priority handling are met, re-selecting a cell by applying the priority of the UE for the particular frequency.

The determining of whether the conditions for suspending application of autonomous priority handling are met may include: when a command for suspending autonomous priority handling is received from the network, determining that the conditions for suspension are met.

The method may further include: when the conditions for suspension are met, initiating a suspend timer.

The determining of whether the conditions for resuming application of autonomous priority handling are met may include: when the suspend timer expires, determining that the conditions for resuming application of autonomous priority handling are met.

The suspend timer may be set to a pre-set value.

The command for suspending application of autonomous priority handling may include suspension duration information, and the suspend timer may be set to a value indicated by the suspension duration information.

The determining of whether the conditions for suspending application of autonomous priority handling are met may include: when dedicated priority is received from the network, it is determined that the conditions for suspension are met, wherein the frequency priority set by the network may include common priority broadcast by the network and dedicated priority.

The method may further include: initiating the suspend timer when the conditions for suspension are met.

The determining of whether the conditions for resuming application of autonomous priority handling may include: when the suspend timer expires, determining that the conditions for resuming application of autonomous priority handling are met.

The method may further include: when the dedicated priority is received, initiating validity timer set to a time at which the dedicated priority is validly applied.

The determining of whether the conditions for resuming application of autonomous priority handling are met may include: when the suspend timer expires while the validity timer is being driven, determining that the conditions for resuming application of autonomous priority handling are met; and when the validity timer expires while the suspend timer is being driven, determining that the conditions for resuming application of autonomous priority handling are met.

The particular frequency may be a frequency in which a multimedia broadcast and multicast service (MBMS) that the UE wants to receive is provided, and the autonomous priority handling may apply highest priority to the frequency in which the MBMS is provided.

The particular frequency may be a frequency operated by a closed subscriber group (CSG) cell to which the UE belongs as a member, and the autonomous priority handling may apply highest priority to the frequency operated by the CSG cell.

In another aspect, a wireless device operating in a wireless communication system is provided. The wireless device includes: a transceiver configured to transmit and receive a radio signal; and a processor functionally coupled to the transceiver and operated. The processor may determine whether conditions for suspending application of autonomous priority handling are met, the autonomous priority handling applying priority of a UE and being differentiated from frequency priority set by a network for a particular frequency, and when the conditions for suspension are met, the processor may re-select a cell by applying the frequency priority set by the network to the particular frequency, determine whether conditions for resuming application of autonomous priority handling are met, and when the conditions for resuming application of autonomous priority handling are met, the processor may select a cell by applying the priority of the UE for the particular frequency.

According to embodiments of the present invention, a network may control autonomous priority handling that may be a basis during a process of cell re-selection of a UE. Through this, the network may appropriately control whether to apply autonomous priority handling by the UE for the purpose of operation. Thus, a phenomenon in which accesses of UEs to a particular frequency are concentrated on a particular frequency or accesses of UEs are concentrated on a particular type of cell may be resolved, implementing network optimization.

DESCRIPTION OF EXEMPLARY EMBODIMENTS

Figure 1:
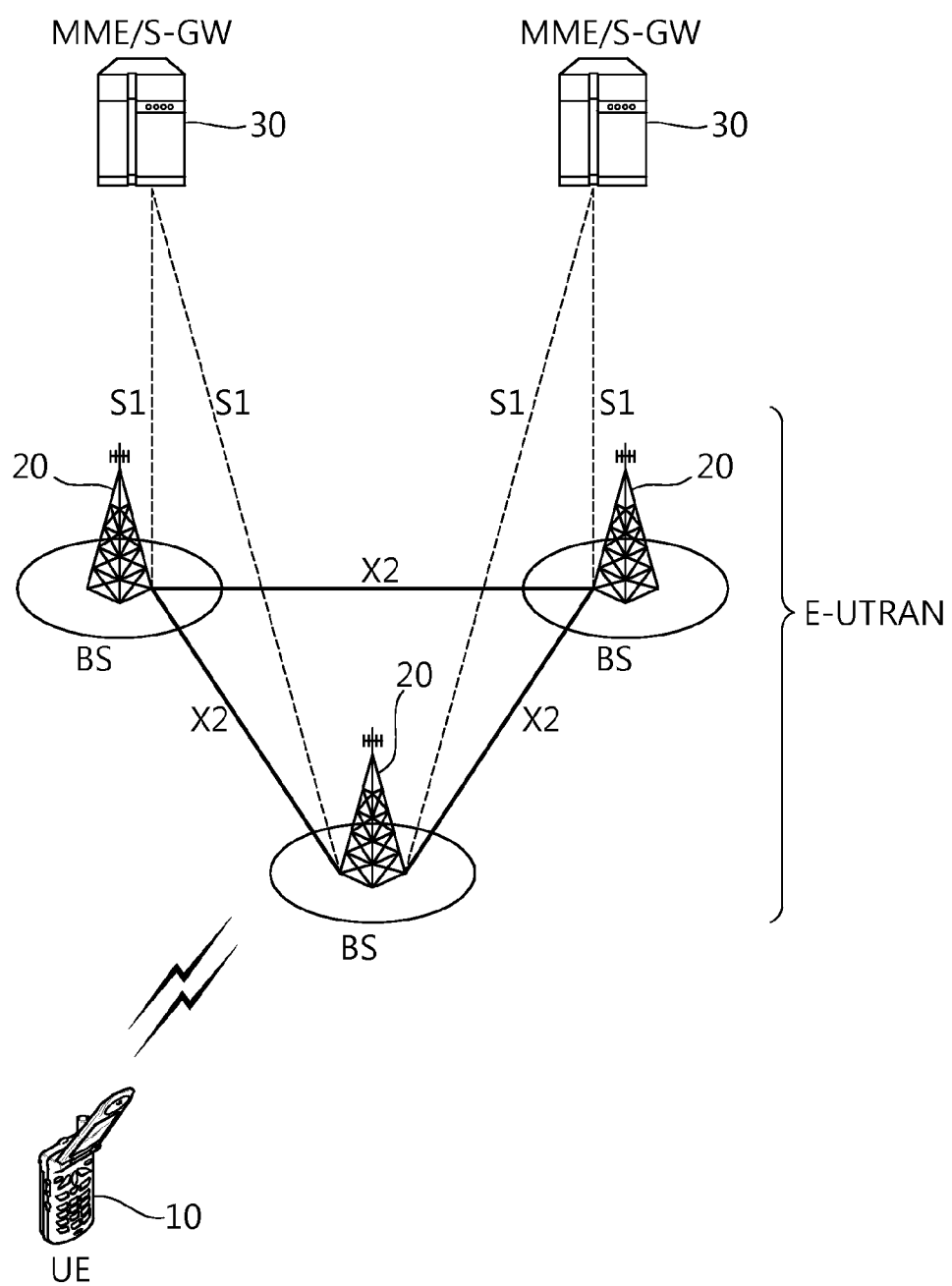
FIG. 1 illustrates a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
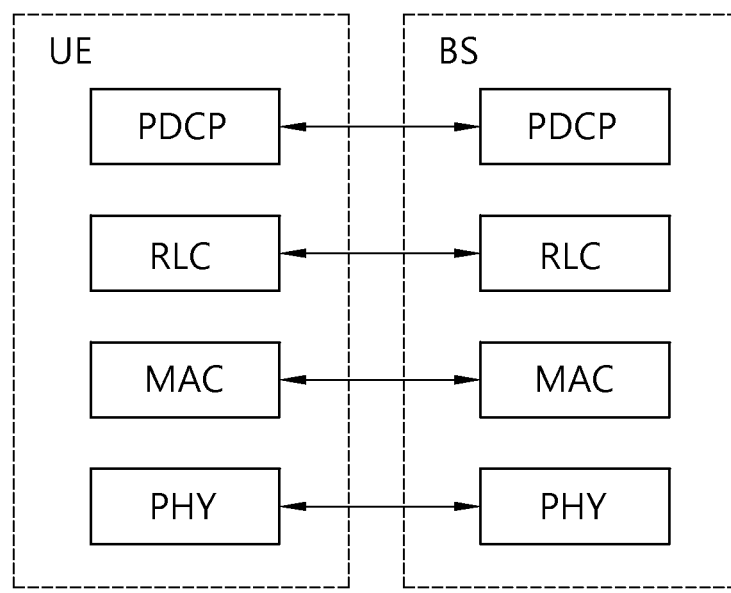
FIG. 2 is a block diagram showing the structure of a wireless protocol on the user plane.
Figure 3:
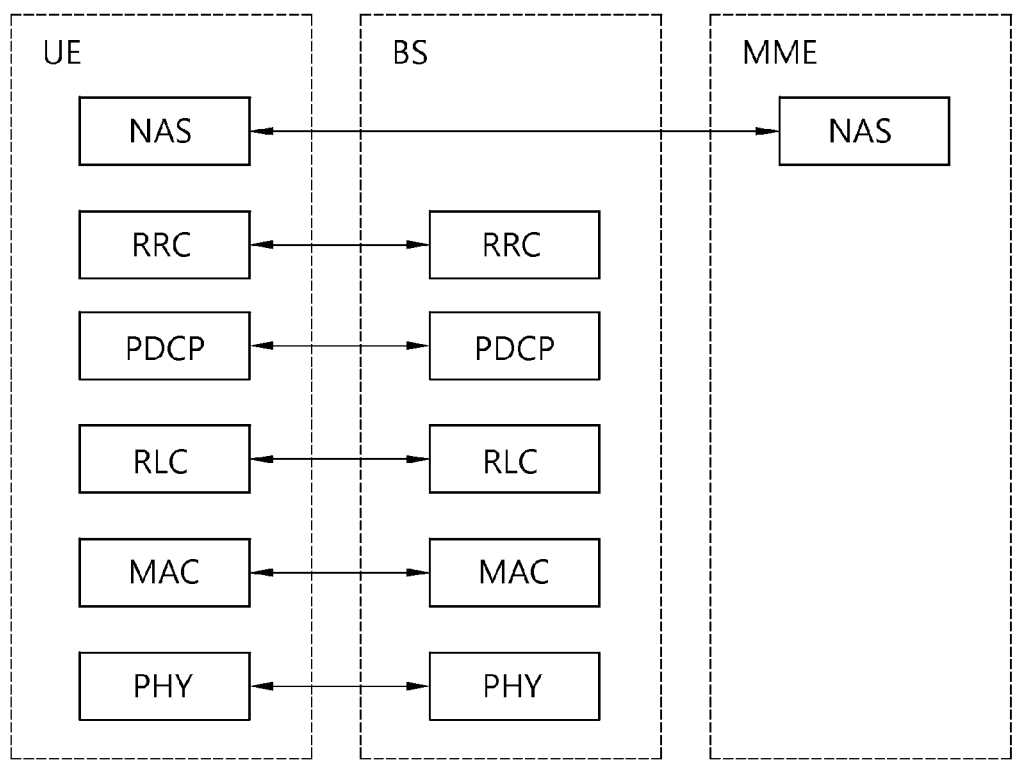
FIG. 3 is a block diagram showing the structure of a wireless protocol on the control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is transferred via a physical channel between different physical layers, namely, physical layers of a transmitter and a receiver. The physical channel may be modulated according to an orthogonal frequency division multiplexing (OFDM) scheme and utilizes time and frequency as radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

The RRC layer is defined only in a control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

The setup of the RB implies a process for specifying a radio protocol layer and channel properties to provide a particular service and for determining respective detailed parameters and operations. The RB can be classified into a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block, a resource allocation unit, includes a plurality of OFDM symbols and a plurality of sub-carriers. Further, each subframe may use specific sub-carriers of OFDM symbols (e.g., a OFDM first symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Figure 4:
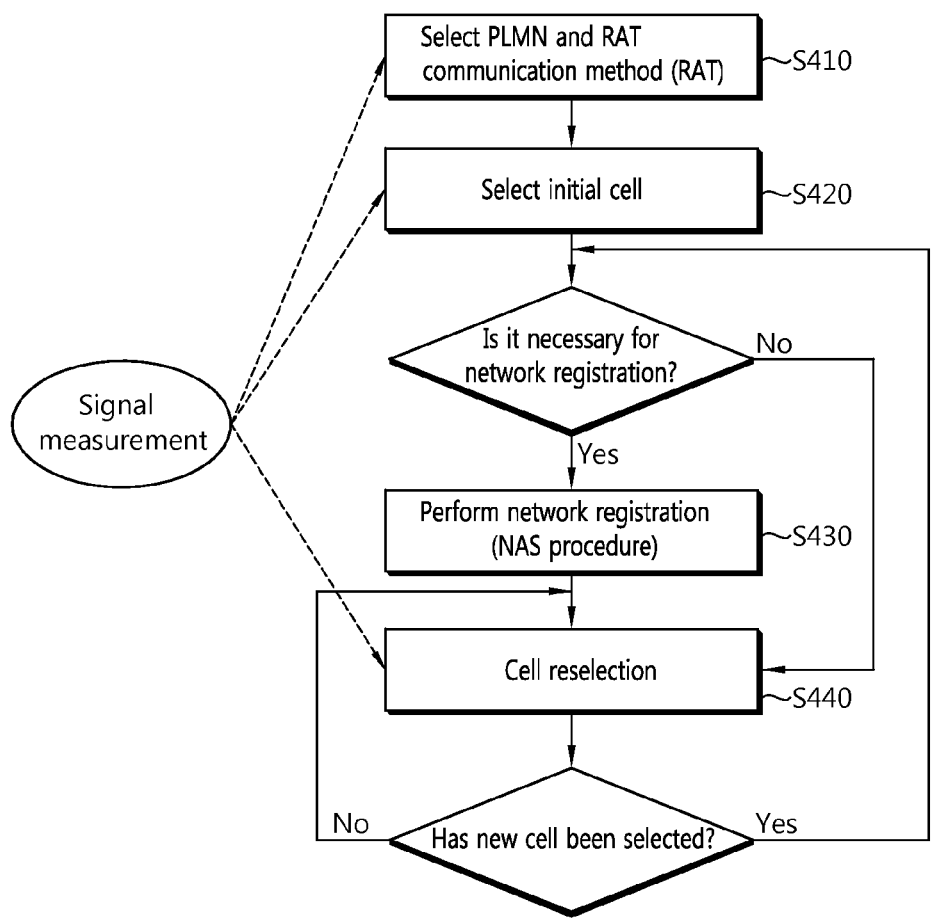
FIG. 4 is a flow chart illustrating an operation of a user equipment (UE) in an RRC idle state.

FIG. 4 is a flow chart illustrating an operation of a UE in an RRC idle state. Specifically, FIG. 4 shows a procedure in which a UE is registered to a network through a cell selection process when power of the UE is turned on, and a cell re-selection is performed when necessary.

Referring to FIG. 4, the UE selects a radio access technology (RAT) for communicating with a PLMN (public land mobile network) as a network the UE wants to receive a service therefrom (S410). Information regarding the PLUM and RAT may be selected by a user of the UE, or that stored in a USIM (universal subscriber identity module) may be used.

The UE selects a cell having the greatest value among cells in which signal strength or quality thereof is greater than a particular value (S420). This is performed by a UE as power thereof is turned on, which may be called an initial cell selection. The cell selection procedure will be described later. After the cell selection, the UE receives system information periodically transmitted by a BS. The particular value refers to a value defined in the system in order to guarantee quality of a physical signal in data transmission and reception. Thus, it may vary according to an applied RAT.

When a network registration is required, the UE performs a network registration procedure (S430). In order to receive a service (e.g., paging) from the network, the UE registers its information (e.g., an IMSI). The UE is not registered to a network whenever a cell is selected, and registered to a network when information (e.g., tracking area identity (TAI)) of a network received from the system information and information of a network the UE knows are different.

The UE performs cell re-selection based on a service environment provided in a cell, a UE environment, or the like (S440). When signal strength or quality value measured from a BS serving the UE is lower than a value measured from a BS of an adjacent cell, the UE selects one of cells providing better signal characteristics than that of the cell of the BS the UE has accessed. This process is called a cell re-selection, discriminated from initial cell selection performed twice. Here, in order to prevent a cell is frequently re-selected according to a change in signal characteristics, a temporal constraint is provided. The cell re-selection procedure will be described later.

Figure 5:
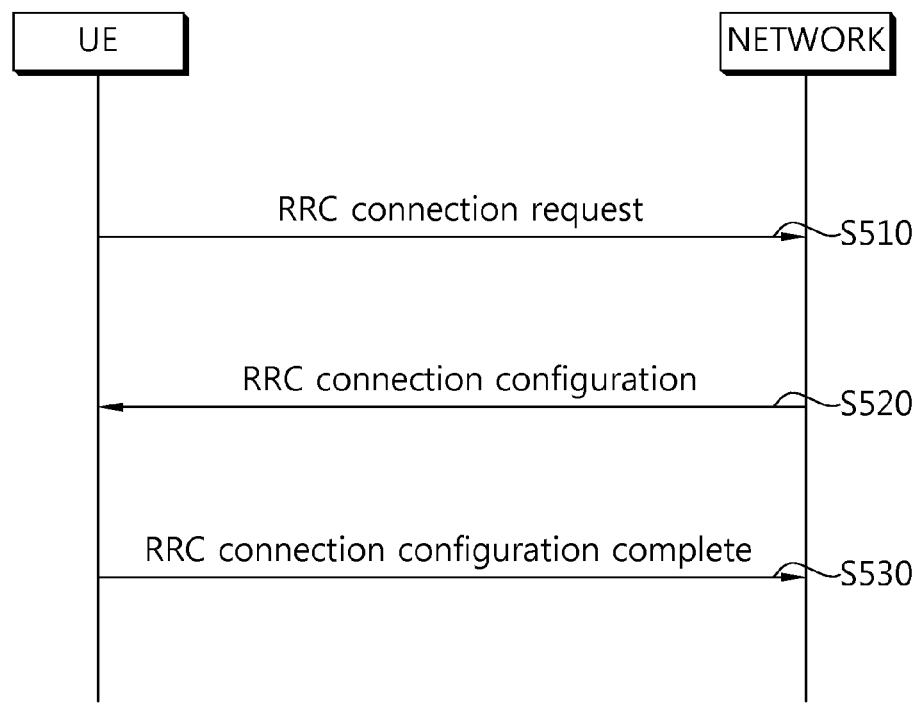
FIG. 5 is a flow chart illustrating a process of establishing an RRC connection.

FIG. 5 is a flowchart showing an RRC connection establishment procedure.

A UE sends to a network an RRC connection request message for requesting an RRC connection (step S510). The network sends an RRC connection setup message in response to the RRC connection request (step S520). After receiving the RRC connection setup message, the UE enters an RRC connection mode.

The UE sends to the network an RRC connection setup complete message used to confirm successful completion of the RRC connection establishment (step S530).

Figure 6:
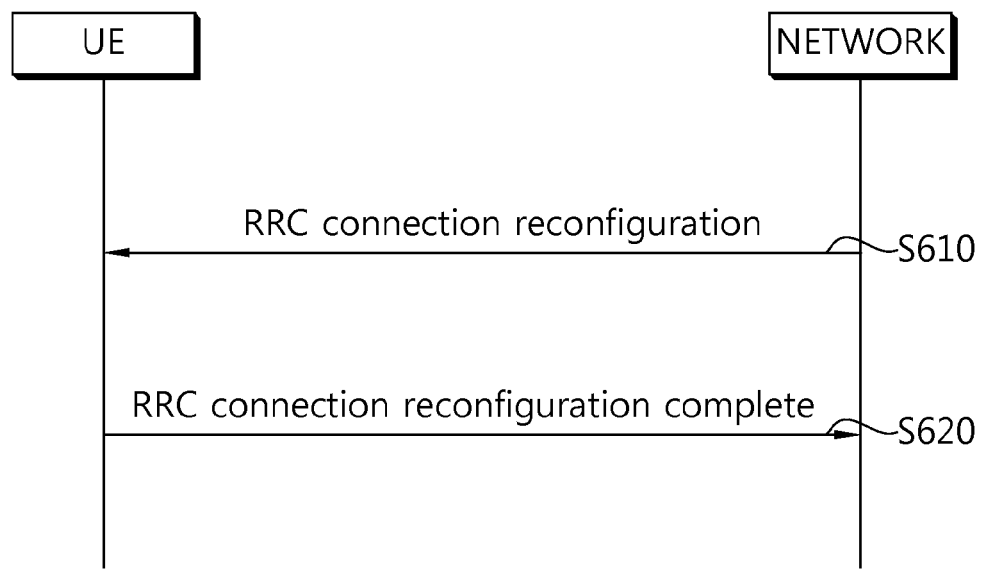
FIG. 6 is a flow chart illustrating a process of re-establishing an RRC connection.

FIG. 6 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S610). In response to the RRC connection reconfiguration, the UE sends to the network an RRC connection reconfiguration complete message used to confirm successful completion of the RRC connection reconfiguration (step S620).

Next, a procedure for selecting a cell by the UE will be described in detail.

If the UE is turned on or is camped on a cell, the UE may perform procedures for selecting/reselecting a cell having suitable quality in order to receive a service.

The UE in an RRC idle state needs to be ready to receive the service through the cell by selecting the cell having suitable quality all the time. For example, the UE that has been just turned on must select the cell having suitable quality so as to be registered into a network. If the UE that has stayed in an RRC connected state enters into the RRC idle state, the UE must select a cell on which the UE itself is camped. As such, a process of selecting a cell satisfying a certain condition by the UE in order to stay in a service waiting state such as the RRC idle state is called a cell selection. The cell selection is performed in a state that the UE does not currently determine a cell on which the UE itself is camped in the RRC idle state, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

Hereinafter, by referring to the 3GPP TS 36.304 V8.5.0 (2009-03) "User Equipment (UE) procedures in idle mode (Release 8)", a method and procedure for selecting a cell by a UE in 3GPP LTE will be described in detail.

When power is initially turned on, the UE searches for available PLMNs and selects a suitable PLMN to receive a service. The PLMNs are networks deployed or operated by a mobile network operator. Each mobile network operator may operate one or more PLMNs. Each PLMN may be identified by a mobile country code (MCC) or a mobile network code (MNC). PLMN information of a cell is included in system information and broadcast. The UE attempts to register a selected PLMN. When the registration is successful, the selected PLMN becomes a registered PLMN. The network may signal a PLMN list to the UE, and here, PLMNs included in the PLMN list may be considered as PLMNs such as RPLMNs. The UE registered to the network is reachable by the network any time. If the EU is in an ECM-CONNECTED state (or in an RRC connected state), the network recognizes that the UE is served. However, in a case in which the UE is in an ECM-IDLE state (or in an RRC idle state), the situation of the UE is stored in the MME, although not valid in an eNB. In this case, a location of the UE in the ECM-IDLE state may be informed only to the MME, by granularity of a list of tracking areas (TAs). A single TA is identified by a tracking area identity (TAI) configured as a PLMN identifier to which a TA belongs and a tracking area code (TAC) solely expressing a TA within a PLMN.

Subsequently, the UE selects a cell having a signal quality and property capable of receiving a suitable service among the cells provided by the selected PLMN.

The cell selection process can be classified into two processes.

One process is an initial cell selection process, and in this process, the UE does not have previous information on radio channels. Therefore, the UE searches for all radio channels to find a suitable cell. In each channel, the UE searches for the strongest cell. Subsequently, if a suitable cell satisfying cell selection criteria is found, the UE selects the cell.

Next, the UE may select a cell by utilizing information broadcast in a cell. Thus, a cell may be promptly selected, compared to the initial cell selection process. When the UE discovers a cell that satisfies the cell selection reference, the UE selects the corresponding cell. If the UE fails to find an appropriate cell that satisfies the cell selection reference through this process, the UE performs the initial cell selection process.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called a cell reselection. A basic purpose of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principles of the cell reselection process are as follows.

First, the UE measures quality of a serving cell and a neighboring cell for a cell reselection.

Second, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE. Cell re-selection priority provided through broadcast signaling may be called common priority. Cell re-selection priority set by the network for each UE may be called dedicated priority. When the UE receives dedicated priority, the UE may receive validity time related to the dedicated priority together. Upon receiving the dedicated priority, the UE initiates a validity timer set to the validity time received together. While the validity timer operates, the UE applies the dedicated priority in an RRC idle mode. When the validity timer expires, the UE discards the dedicated priority and applies the common priority again.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 1 below.

$$R_S = Q_{meas,s} + Q_{hyst}, R_n = Q_{meas,n} - Q_{offset}$$ [Equation 1]

Herein, Rs denotes a ranking value of a serving cell, Rn denotes a ranking criterion of a neighboring cell, Qmeas,s denotes a quality value measured for the serving cell by the UE, Qmeas,n denotes a quality value measured for the neighboring cell by the UE, Qhyst denotes a hysteresis value for ranking, and Qoffset denotes an offset between two cells.

In the intra-frequency cell reselection, if the UE receives an offset Qoffsets,n between the serving cell and the neighboring cell, Qffoset=Qoffsets,n. Otherwise, Qffoset=0.

In the inter-frequency cell reselection, if the UE receives the offset Qoffsets,n, Qoffset=Qoffsets,n+Qfrequency. Otherwise, Qoffset=Qfrequency.

If the ranking criterion Rs of the serving cell and the ranking criterion Rn of the neighboring cell are not much different from each other and constantly vary, ranking orders of the serving cell and the neighboring cell may change frequently. Thus, the serving cell and the neighboring cell may be reselected alternately while changing their ranking orders frequently. In order to prevent the UE from reselecting two cells alternately, the hysteresis value Qhyst is used to give a hysteresis in the cell reselection.

The UE measures the ranking criterion Rs of the serving cell and the ranking criterion Rn of the neighboring cell according to the above equation. A cell having the greatest ranking criterion value is reselected by considering this cell as a best-ranked cell.

In the above-mentioned cell reselection criterion, the quality of cells is considered as a most important factor when performing the cell reselection. If a reselected cell is not a suitable cell, the UE excludes the reselected cell or a frequency of the reselected cell from targets of the cell reselection.

Next, procedures for measurement and measurement report will be described in detail.

It is essential for a wireless communication system to support mobility of a UE. Therefore, the UE persistently measures quality of a serving cell providing a current service and quality of a neighbor cell. The UE reports a measurement result to a network at a proper time. The network provides optimal mobility to the UE by using a handover or the like. A measurement based on such a purpose is called a radio resource management (RRM) measurement.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (e.g., a global cell identity) of the specific cell, location identification information indicating a location of the specific cell (e.g., a tracking area code), and/or other cell information (e.g., whether it is a member of a closed subscriber group (CSG) cell).

While moving, if the UE determines that quality of a specific region is significantly poor, the UE may report a measurement result and location information on the poor cell to the network. The network may attempt to optimize the network on the basis of the measurement result reported from UEs which assist the network operation.

In a wireless communication system having a frequency reuse factor of 1, mobility is generally supported between different cells existing in the same frequency band. Therefore, in order to properly guarantee the UE mobility, the UE has to properly measure cell information and quality of neighbor cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

Service providers may operate networks by using a plurality of frequency bands. If a service of a communication system is provided by using the plurality of frequency bands, optimal mobility can be guaranteed to the UE when the UE is able to properly measure cell information and quality of neighbor cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 2000 system conforming to the 3GPP2 standard.

A UE receives measurement configuration information from a BS. A message including the measurement configuration information is referred to as a measurement configuration message. The UE performs measurement based on the measurement configuration information. If a measurement result satisfies a reporting condition included in the measurement configuration information, the UE reports the measurement result to the BS. A message including the measurement result is referred to as a measurement report message.

The measurement configuration information may include the following information.

(1) Measurement object information: This is information regarding an object on which the UE performs measurement. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration information: This includes a reporting condition regarding when the UE reports measurement results and a reporting type. The reporting condition may include an event or a period that triggers the UE to report measurement results. The reporting type is information regarding in which type measurement results are to be configured.

(3) Measurement identify information: This is information regarding a measurement identity for the UE to determine in which type and when a measurement target is to be reported by associating a measurement target and a reporting configuration. The measurement identity information may be included in a measurement reporting message to indicate what kind of measurement target a measurement result is related and under which reporting condition measurement reporting has been generated.

(4) Quantity configuration information: This is information regarding a parameter for setting a measurement unit, a reporting unit and/or filtering of measurement result values.

(5) Measurement gap information: This is information regarding a measurement gap as a section used by the UE only for measurement without considering data transmission with a serving cell, when downlink transmission or uplink transmission has not been scheduled.

To perform a measurement procedure, the UE has a measurement object list, a measurement reporting configuration list, and a measurement identity list.

In 3GPP LTE, the BS may set only one measurement object for the UE with respect to one frequency band. Events for triggering measurement reporting shown in the table below are defined in the Paragraph 5.5.4 of 3GPP TS 36.331 V8.5.0 (2009-03) "Evolved Universal Terrestrial Radio Access (E-UTRA) Radio Resource Control (RRC); Protocol specification (Release 8)".

TABLE 1

| Event | Reporting condition |
|---|---|
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

When the measurement results of the satisfy the pre-set event, the UE transmits the measurement report message to the BS.

Measurement reporting may include a measurement identity, measured quality of a serving cell, and measurement results of a neighboring cell. A measurement identity identifies a measurement target triggered for measurement reporting. Measurement results of a neighboring cell may include a cell identifier of a neighboring cell and measurement quality. The measured quality may include at least one of reference signal received power (RSRP) and reference signal received quality (RSRQ).

Now, a radio link failure will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell reselection) procedure, and attempts RRC connection re-establishment to the new cell.

In the specification of 3GPP LTE, normal communication cannot be performed in the following conditions.

When a UE determines that there is a serious problem with a downlink communication link quality based on radio quality measurement result of a physical layer of the UE (when it is determined that quality of a PCell is low during RLM).

When it is determined that there is a problem with an uplink transmission as a random access procedure fails continuously in a MAC sub-layer.

When it is determined that there is a problem with an uplink transmission as an uplink data transmission continuously fails in an RLC sublayer.

When it is determined that handover has failed.

When a message received by the UE does not pass integrity check.

Hereinafter, an RRC connection re-establishment procedure will be described in detail.

Figure 7:
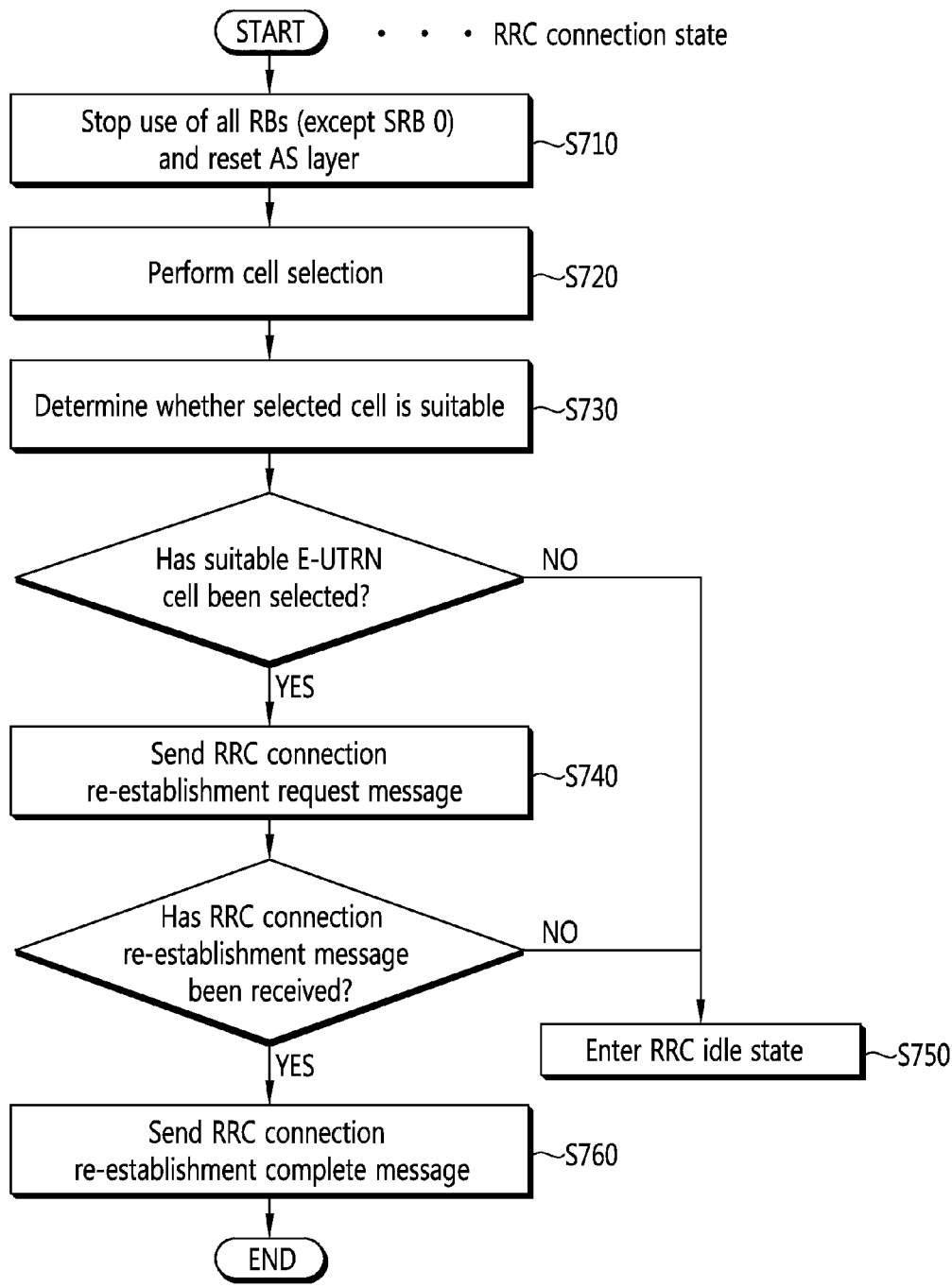
FIG. 7 is a view illustrating a procedure of re-establishing an RRC connection.

FIG. 7 is a flow chart illustrating an RRC connection re-establishment procedure.

Referring to FIG. 7, a UE stops using of all the set radio bearers excluding SRB0 (Signaling Radio Bearer #0), and initializes various sub-layers of an access strantum (S710). Also, the UE sets each sub-layer and physical layer as a default configuration. During this process, the UE is maintained in an RRC connected state.

The UE performs a cell selection procedure to perform an RRC connection re-establishment procedure (S720).

Although the UE is maintained in the RRC connected state, the cell selection procedure included in the RRC connection re-establishment procedure may be performed in the same manner as the cell selection procedure performed by the UE in an RRC idle state.

After performing the cell selection procedure, the UE checks system information of a corresponding cell to determine whether or not the corresponding cell is an appropriate cell (S730). When the selected cell is determined to be an appropriate E-UTRAN cell, the UE transmits an RRC connection reestablishment request message to the corresponding cell (S740).

Meanwhile, when it is determined that the cell selected through the cell selection procedure to perform an RRC connection re-establishment procedure is a cell that uses an RAT other than the E-UTRAN, the RRC connection re-establishment procedure is stopped and the UE enters an RRC idle state (S750).

The UE may be implemented to finish checking appropriateness of a cell within a limited time through the cell selection procedure and reception of system information of a selected cell. To this end, the UE may drive a timer when an RRC connection re-establishment procedure starts. The timer may be stopped when the UE determines that an appropriate cell has been selected. When the timer expires, the UE may determine that the RRC connection reestablishment procedure has failed and enters an RRC idle state. The timer will be referred to as a radio link failure timer hereinafter. In the LTE specification TS 36.331, a timer named T311 may be utilized as a radio link failure timer. The UE may obtain a set value of the timer from system information of a serving cell.

When the cell receives an RRC connection re-establishment request message from the UE and accepts the request, the cell transmits an RRC connection reestablishment message to the UE.

Upon receiving the RRC connection reestablishment message from the cell, the UE reconfigures a PDCP sublayer and an RLC sublayer with respect to an SRB1. Also, the UE re-calculates various key values in relation to security setting, and re-configures a PDCP sublayer responsible for security with newly calculated security key values. Through this, the SRB1 between the UE and the CELL is open, and an RRC control message may be exchanged. The UE completes resuming of the SRB1, and transmits an RRC connection reestablishment complete message indicating that the RRC connection reestablishment procedure was completed to the cell (S760).

Meanwhile, upon receiving the RRC connection reestablishment request message, if the cell does not accept the request, the cell transmits an RRC connection reestablishment reject message to the UE.

When the RRC connection reestablishment procedure is successfully performed, the cell and the UE performs an RRC connection reestablishment procedure. Through this, the UE may recover the state before the RRC connection reestablishment procedure was performed and continuity of a service is guaranteed to its maximum level.

Hereinafter, an H(e)NB will be described.

A mobile communication service may be provided via a base station (BS) owned by an individual or a particular provider or group, besides a mobile communication network carrier. Such a BS is called a home NB (HNB) or a home eNB (HeNB). HNB and HeNB will be referred to as HeNB. An HeNB basically aims at providing a service specified for only a closed subscriber group (CSG). However, an HeNB may also provide a service to users other than a CSG according to setting of an operation mode.

Figure 8:
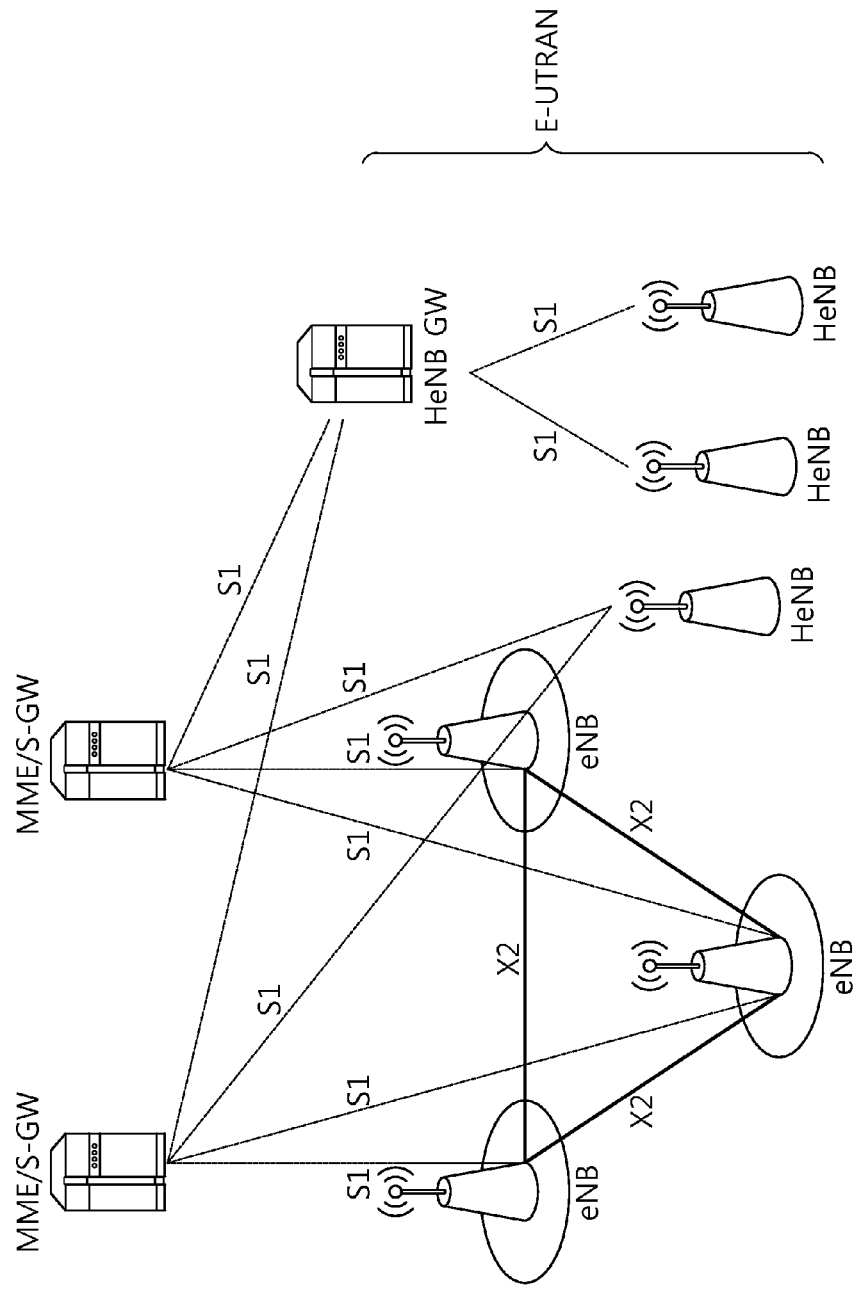
FIG. 8 is a view illustrating an example of a wireless communication system for HeNB operation.

FIG. 8 is a view illustrating an example of a wireless communication system providing an HeNB operation.

Referring to FIG. 8, in order to provide HeNB service, a home eNB gateway (HeNB GW) may be operated. HeNBs may be connected to an EPC through the HeNB GW or directly connected to the EPC. For MMEs, the HeNB GW seems to be a general eNB. For HeNBs, the HeNB GW seems to be an MME. Thus, the HeNBs and the HeNB GW are connected by an S1 interface, and the HeNB GW and the EPC are also connected by an S1 interface. Also, when the HeNBs and the EPC are directly connected, they are connected by an S1 interface. Functions of the HeNBs are mostly identical to those of a general eNB.

In general, a wireless transmission output of an HeNB is low, relative to an eNB owned by a mobile communication network provider. Thus, coverage provided by an HeNB is generally smaller than that provided by an eNB. Due to this characteristics, a cell provided by an HeNB is classified as a femto cell, in comparison to a macro cell provided by an eNB in terms of coverage. Meanwhile, in terms of provided service, when an HeNB provides a service only to a CSG group, a cell provided by the HeNB is called a CSG cell.

Each CSG has a unique identification number, and the identification number is called a CSG identity (ID). A UE may have a list of CSGs to which the UE belongs as a member, and the CST list may be altered according to a UE request or a command of a network. In general, a single HeNB may support a single CSG.

An HeNB delivers a CSG ID of a CSG supported by the HeNB through system information to allow only member UEs of the corresponding CSG to access. When a UE discovers a CSG cell, the UE may check what kind of CSG the CSG cell supports by reading a CSG ID included in system information. Upon receiving the CSG ID, the UE may regard the corresponding cell as a cell the UE may access only when the UE is a member of the corresponding CSG cell.

An HeNB may not need to permit only a CSG UE to access all the time. Namely, an HeNB may permit a UE, not a CSG member, to access according to a configuration setting of the HeNB. Which UE is permitted to access may be changed according to a configuration setting of an HeNB, and here, a configuration setting refers to a setting of an operation mode of the HeNB. The operation mode of the HeNB is classified into three modes depending on to which UEs a service is provided.

Closed access mode: A mode providing a service only to a particular CSG member. An HeNB provides a CSG cell.

Open access mode: A mode in which a service is provided without restriction such as a particular CSG member like a general eNB. An HeNB provides a general cell, rather than a CSG cell.

Hybrid access mode: A mode in which a CSG service may be provided to a particular CSG member and a service is provided to a non-CSG member, like a general cell. For a CSG member UE, a cell is recognized as a CSG cell, and for a non-CSG member UE, the cell is recognized as a general cell. Such a cell is called a hybrid cell.

An HeNB informs a UE about whether a cell served by the HeNB is a CSG cell and a general cell to allow to UE to know whether the corresponding cell is accessible. An HeNB operated in the closed access mode broadcasts that the HeNB is a CSG cell, through system information. An HeNB operated in the open access mode broadcasts that the HeNB is not a CSG cell, through system information. In this manner, the HeNB includes a 1-bit CSG indicator indicating whether the cell served by the HeNB is a CSG cell or not, in system information. For example, in case of a CSG cell, a CSG indicator is set to TRUE and broadcast. If a served cell is not a CSG cell, the CSG indicator may be set to FALSE or transmission of a CSG indicator may be omitted. A UE needs to discriminate a general cell served by an eNB from a CSG cell, a general eNB may also transmit a CSG to allow a UE to recognize that a cell type served by the eNB is a general cell. The general eNB may not transmit a CSG indicator so that a UE recognizes that a cell type served by the eNB is a general cell. Table 2 shows CSG-related parameters transmitted in corresponding cells by cell type. Table 3 shows types of UEs allowed for accessing by cell type

TABLE 2

|  | CSG cell | General cell |
| --- | --- | --- |
| CSG indicator | Indicates 'CSG cell' | Indicates 'Non-CSG cell' or not transmitted |
| CSG identifier | Supported CSG identifier is transmitted | not transmitted |

TABLE 3

|  | CSG cell | General cell |
| --- | --- | --- |
| UE not supporting CSG | inaccessible | accessible |
| Non-CSG member UE | inaccessible | accessible |
| member CSG UE | accessible | accessible |

In a certain frequency, a CSG cell and a (general) macro cell are operated simultaneously, which is called a mixed carrier frequency. A network may reserve a particular physical layer cell identity in the mixed carrier frequency, for a CSG cell. The physical layer cell identity is called a PCI (Physical Cell Identity) in the E-UTRAN, and is called a PSC (Physical scrambling code) in the UTRAN. For the description purpose, the physical layer cell identity will be expressed as a PCI. In the mixed carrier frequency, a CSG cell provides information regarding a PCI reserved for the CSG in a current frequency, through system information. Upon receiving the information, when the UE discovers a certain cell in the corresponding frequency, the UE may be able to determine whether or not the cell is a CSG cell from the PCI of the cell.

In case of a UE that does not support a CSG related function or does not have a CSG list to which the UE belongs as a member, the UE may not need to regard a CSG cell as a selectable cell in the cell selection/re-selection process. In this case, the UE checks only the PCI of the cell, and when the PCI is a PCI reserved as a CSG, the UE may immediately exclude the corresponding cell in the cell selection/re-selection process. In general, a PCI of a certain cell may be immediately known in the process in which a physical layer of the UE checks the presence of a corresponding cell.

Second, in case of a UE that has a CSG list to which the UE belongs as a member, when the UE wants to know a list regarding adjacent CSG cells in the mixed carrier frequency, if the UE discovers only a cell having a PCI reserved for a CSG, it can know that the corresponding cell is a CSG cell, rather than checking CSG identifiers of system information of all the cells discovered in the entire PCI range one by one.

Hereinafter, a cell re-selection process in relation to a CSG cell will be described.

A CSG cell is a cell for providing a better service to a corresponding CSG member UE. Thus, when the UE is camped on in the CSG cell, it may not be desirous in terms of quality of service (QoS) if the UE discovers an inter-frequency having frequency priority higher than that of a serving frequency and re-selects a cell of the inter-frequency, In order to prevent the UE from unconditionally re-select a cell by inter-frequency having frequency priority higher than that of the serving frequency when the UE is camped on in the CSG, it is assumed that when a CSG cell of a certain frequency is best ranked according to a cell re-selection evaluation reference in the frequency, frequency priority of the corresponding frequency is higher than that of other frequencies. In this manner, when the UE designates frequency priority (priority higher than priority of 8 class designated by a network) higher than frequency priority that may be designated by a network with respect to a particular frequency, such frequency priority is called implicit highest priority. By doing that, it helps the UE is camped on in the CSG cell, while the rule in the existing cell selection that frequency priority is first considered when the UE performs cell re-selection. If the UE in the CSG cell re-selects a non-CSG cell of the corresponding frequency, the UE may withdraw the implicit highest priority assumption with respect to the corresponding frequency and uses the frequency priority value transferred from the network in evaluating cell re-selection.

When the UE discovers one or more appropriate CSG cells in a different frequency, the implicit highest priority may be applied. Namely, when a considered cell is a highest ranking in a corresponding frequency, the UE may apply a highest priority to a frequency of the CSG cell, regardless of priority of a frequency of a cell in which the UE is camped on, and perform cell re-selection.

If a different CSG cell best linked in a frequency having the same frequency priority is discovered when the UE is camped on in the CSG cell, whether the UE re-selects the CSG cell or whether the UE remains in the CSG cell in which it is currently camped on follows an implementation of the UE.

Hereinafter, a multimedia broadcast and multicast service (MBMS) will be described in detail.

An MCCH channel or an MTCH channel, a logical channel, may be mapped to an MCH channel, a transport channel, for an MBMS. The MCCH channel transmits an MBMS-related RRC message, and the MTCH channel transmits traffic of a particular MBMS service. There is a single MCCH channel in every MBMS single frequency network (MBSFN) transmitting the same MBMS information/traffic, and when a plurality of MBSFN areas are provided in a cell, a UE may receive a plurality of MCCH channels. When an MBMS-related RRC message is changed in a particular MCCH channel, a PDCCH channel transmits an MBMS radio network temporary identity (M-RNTI) and an indicator indicating a particular MCCH channel. A UE supporting the MBMS receives the M-RNTI and the MCCH indicator through a PDCCH channel, recognizes that an MBMS-related RRC message has been changed in the particular MCCH channel, and receives the particular MCCH channel. The RRC message of the MCCH channel may be changed at every change period and may be periodically broadcast at every repetition period.

While being provided with the MBMS service, the UE may receive a dedicated service. For example, a certain user may view a TV using an MBMS service through his or her smartphone, while chatting using an instant messaging (IM) service such as MSN or Skype through the smartphone. In this case, the MBMS service may be provided through an MTCH received by several UEs together, and the service individually provided to each UE like the IM service may be provided through a dedicated bearer such as a DCCH or a DTCH.

In an area, a certain BS may use several frequencies simultaneously. In this case, in order to effectively use radio resource, a network may select one of the several frequencies, provides an MBMS service only in the frequency, and provides a dedicated bearer to each UE in every frequency.

In this case, in a case in which a UE, served using a dedicated bearer in a frequency in which an MBMS service is not provided, wants to receive an MBMS service, the UE needs to perform handover to a frequency in which the MBMS is provided. To this end, the UE transmits an MBMS interest indicator to the BS. Namely, when the UE wants to receive an MBMS service, the UE transmits an MBMS interest indicator to the BS, and upon receiving the MBMS interest indicator, the UE recognizes that the UE wants to receive an MBMS service, and shifts the UE to a frequency in which the MBMS is provided. Here, the MBMS interest indicator refers to information indicating that the UE wants to receive an MBMS service and additionally includes information regarding to which frequency the UE wants to shift.

When the UE wants to receive a particular MBMS service, the UE first recognizes information regarding a frequency in which the MBMS service is provided and broadcast time information. When the MBMS has already been broadcast or is about to start, the UE sets priority of the frequency in which the MBMS service is provided, to be highest. Using the re-set frequency priority information, the UE performs a cell re-selection procedure to thereby move to a cell in which the MBMS service is provided, and receive the MBMS service.

In a case in which the UE is receiving an MBMS service, in a case in which the UE is interested in receiving an MBMS service, or in a case in which the UE may be able to receive an MBMS service while being camped on in a frequency in which the MBMS service is provided, if a situation in which the re-selected cell broadcasts SIB13 continues, it may be considered that the highest priority has been applied to the corresponding frequency during the MBMS session.

In a case in which a fact that one or more MBMS service area identities (SAIs) are included in a user service description (USD) of a corresponding service is indicated by SIB15 of a serving cell.

In a case in which SIB15 is not broadcast within a serving cell and a corresponding frequency is included in a USD of a corresponding service.

In general, a UE in an RRC idle state performs an inter-frequency cell re-selection based on frequency priority set by a network. However, in a case in which a UE intends to select a cell providing a particular service or in a case in which a UE intends to select a cell providing a service only to a UE having special qualifications, the UE regards a particular frequency as having frequency priority, rather than frequency priority set by a network, and performs cell re-selection. In this manner, the operation of performing cell re-selection based on frequency priority re-set by the UE may be called autonomous priority handling. An example of autonomous priority handling may be the cell re-selection method related to a reference CSG cell or an MBMS service providing cell as described above.

Whether to apply autonomous priority handling is generally determined by a UE, and a network cannot control autonomous priority handling of the UE. As a result, since each UE performs cell re-selection based on autonomous priority handling, a phenomenon that UEs concentrate on a particular frequency may occur. Also, even though a network moves a UE to a particular frequency for the purpose of operation, the UE may move to a frequency different from that intended by the network due to autonomous priority handling by the UE. This may result in ineffectiveness of a service due to concentration of UEs on a particular frequency and/or a cell operating with the particular frequency and limitation of optimization by the network. Thus, the present invention proposes a scheme of controlling autonomous priority handling of a UE.

Figure 9:
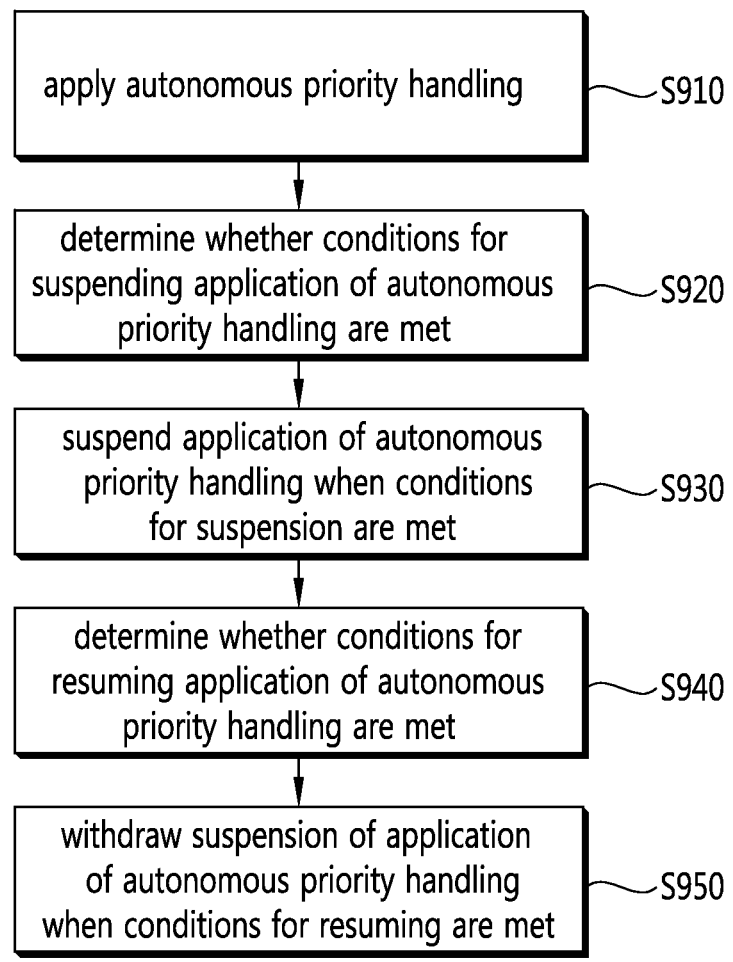
FIG. 9 is a flow chart illustrating a method for controlling an autonomous priority handling technique according to an embodiment of the present invention.

FIG. 9 is a view illustrating a method for controlling an autonomous priority handling technique according to an embodiment of the present invention.

Referring to FIG. 9, a UE applies autonomous priority handling (S910). In this case, the UE may select a target cell for a cell re-selection based on autonomous priority handling, and performs cell re-selection to the selected target cell. As for the cell re-selection based on autonomous priority handling, in case of a frequency satisfying a particular condition, rather than performing cell re-selection according to frequency priority set by the network, the UE regards priority of a corresponding frequency as a value different from that set by the network and performs cell re-selection. The frequency priority set by the network may be common priority broadcast by system information and/or dedicated priority signaled through signaling for each UE.

In an example of applying autonomous priority handling, setting of priority of a UE related to cell re-selection required for the UE in an RRC idle state to receive an MBMS service may be taken into consideration. In detail, the UE may regards a frequency providing an interest MBMS service or a frequency providing an MBMS service that the UE is currently receiving, as a highest priority and perform a cell re-selection procedure.

In another example of applying autonomous priority handling, setting of a UE related to cell re-selection required for the UE in an RRC idle state to preferentially camp on an appropriate CSG cell may be taken into consideration. In detail, when an appropriate CSG cell has a highest ranking in a corresponding frequency according to results of cell re-selection evaluation, the UE may regard a frequency of the CSG cell as a highest priority frequency and perform a cell re-selection procedure. Also, the UE may regard a frequency of a CSG cell being a CSG member and having a highest cell re-selection ranking in the same frequency as having a highest priority and perform cell re-selection.

In another example of applying autonomous priority handling, upon receiving an indication message indicating that one or more frequencies should be de-prioritized, the UE may regard a corresponding frequency as having a lowest priority and perform cell re-selection.

The UE determines whether conditions for suspending application of autonomous priority handling are met (S920). The conditions for suspending application of autonomous priority handling that may be considered by the UE are as follows.

In a case in which the UE receives information related to dedicated priority from a network. In this case, highest priority may be applied according to autonomous priority handling, or dedicated priority signaled from the network may be applied to a frequency and/or a cell on the frequency to which lowest priority is applied and the application of autonomous priority handling may be suspended.

In a case in which the UE receives instruction to suspend application of autonomous priority handling from the network. In this case, highest priority may be applied according to autonomous priority handling, or priority set by the network may be applied to a frequency and/or a cell on the frequency to which lowest priority is applied.

The network may signal information regarding a target to which autonomous priority handling is applied by the UE is to be suspended. For example, the network may limit a target to which autonomous priority handling is applied by the UE is to be suspended, to priority handling by the UE related to MBMS service reception. In detail, the network may signal information indicating suspension of autonomous priority handling to a frequency and/or a cell of the frequency considered as having highest priority with autonomous priority handling applied thereto in relation to MBMS service reception.

The network may limit a target to which autonomous priority handling is applied by the UE is to be suspended, to priority handling by the UE related to CSG cell re-selection. In detail, the network may signal information indicating suspension of application of autonomous priority handling to a frequency of a CSG cell discovered by the UE or a CSG cell in which the UE is currently camped on.

The target to which autonomous priority handling is applied by the UE is to be suspended may be included in a message causing suspension of application of autonomous priority handling, namely, a message signaling dedicated priority, and/or a message indicating suspension of application of autonomous priority handling, and transmitted to the UE.

When the suspension conditions are met, the UE may suspend application of autonomous priority handling (S930). When a target to be suspended is not signaled, the UE may suspend current application of autonomous priority handling in general. When a target to be suspended is signaled by a network or any other entity, the UE may suspend application of autonomous priority handling to the signaled target to be suspended.

The UE determines whether conditions for resuming application of autonomous priority handling are met (S94), and when the conditions for resuming application of autonomous priority handling are met, the UE may withdraw the suspension of autonomous priority handling and resume application of the autonomous priority handling (S950). The conditions for resuming application of autonomous priority handling that may be considered by the UE are as follows.

In a case in which an instruction for resuming autonomous priority handling is received while the autonomous priority handling has been suspended. In this case, application of the frequency priority which has been applied, for example, the dedicated priority signaled by the network or the common priority broadcast by the network is stopped due to the suspension of autonomous priority handling, and autonomous priority handling may be applied afresh.

In a case in which a particular time duration has lapsed from the suspension of autonomous priority handling. In this case, when a particular time duration has lapsed from the suspension of autonomous priority handling, application of the dedicated priority signaled by the network or the common priority broadcast by the network is suspended and autonomous priority handling may be applied afresh.

In the embodiment of the present invention as described above, a particular point in time at which autonomous priority handling is suspended may be signaled to the UE. The UE may initiate a suspend timer related to suspension of autonomous priority handling. While the suspend timer is being driven, the UE may suspend application of autonomous priority handling, and when the suspend timer expires, the UE resumes application of autonomous priority handling.

A pre-set value of the suspend timer may be set in advance. The suspend timer may be set as a value signaled by the network. The pre-set value of suspend timer may be included in a message transmitted to signal dedicated priority to the UE. The Pre-set value of the suspend timer may be included in a message transmitted to instruct the UE to suspend autonomous priority handling.

Meanwhile, when the UE suspend autonomous priority handling in response to the dedicated priority signaling from the network, an issue related to application of validity timer of the dedicated priority and the suspend timer with respect to priority handling may arise. In this case, suspension and resuming of autonomous priority handling may be operated as follows.

While the UE is applying dedicated priority and the suspend timer is simultaneously operating, the UE suspends autonomous priority handling.

When the suspend timer expires while the UE is applying the dedicated priority, the UE withdraws suspension of autonomous priority handling. Namely, the UE applies autonomous priority handling.

When the validity timer related to the dedicated priority expires before the suspend timer expires, so the common priority is applied, the UE withdraws suspension of autonomous priority handling. Namely, the UE applies autonomous priority handling.

Figure 10:
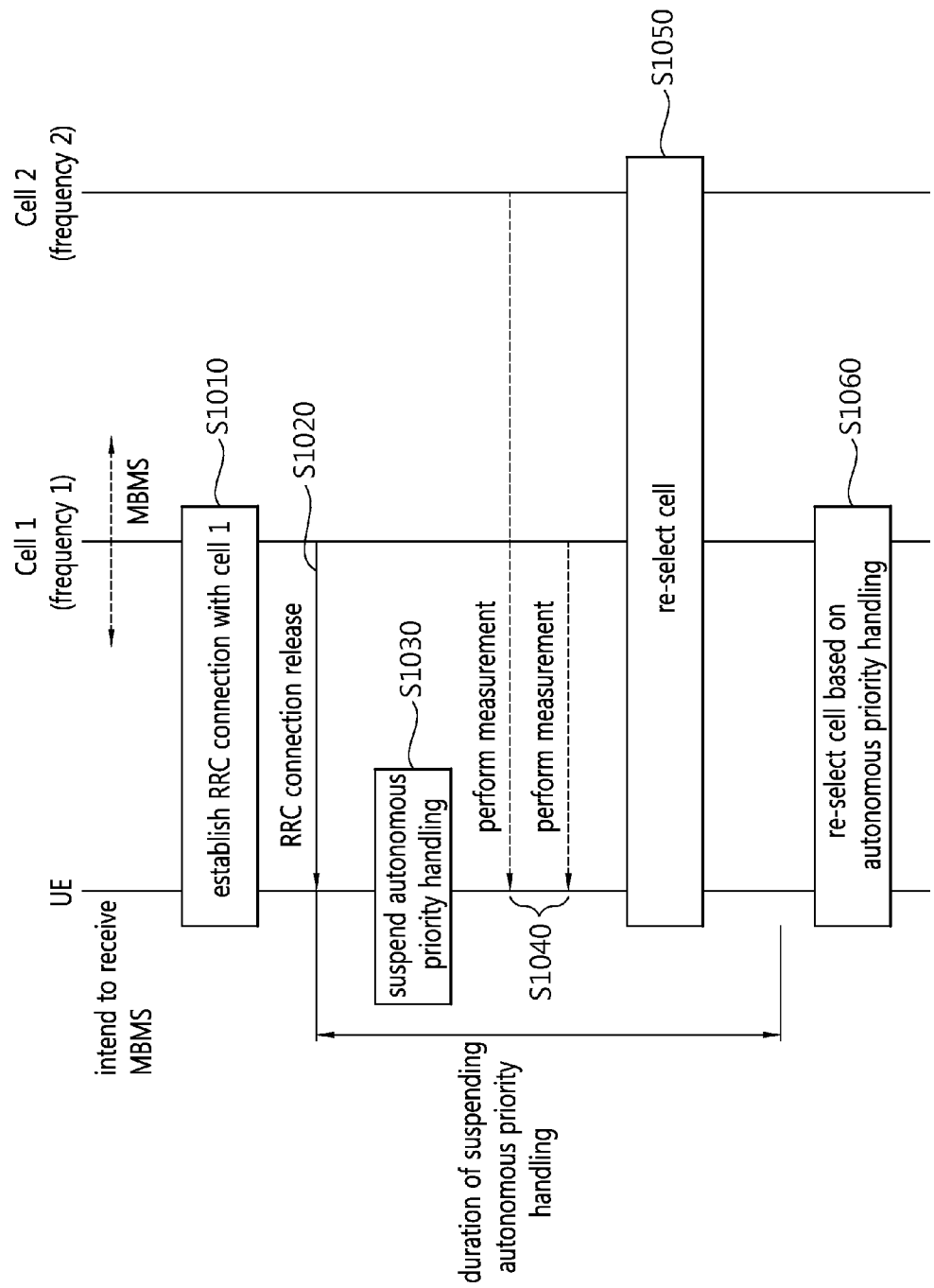
FIG. 10 is a view illustrating an example of a method for selecting a cell based on autonomous priority handling according to an embodiment of the present invention.

FIG. 10 is a view illustrating an example of a cell selection method based on autonomous priority handling according to an embodiment of the present invention.

Referring to FIG. 10, it is assumed that a UE intends to receive an MBMS service. It is assumed that a cell 1 is operated with frequency 1 and an MBMS service is being provided through the corresponding frequency. Also, it is assumed that a cell 2 is operated with a frequency 2 and an MBMS service is not provided. In this example, it is assumed that priority of the frequency 2 as frequency common priority set by a network is higher than that of the frequency 1.

The UE establishes an RRC connection with the cell 1 (S1010). Since the UE applies highest priority to the frequency 1 of the cell 1 providing an MBMS service based on autonomous priority handling, the UE may establish an RRC connection with the cell 1 even though priority of the frequency 2 is higher than that of the frequency 1.

The cell 1 transmits a release message for terminating the RRC connection with the UE to the UE (S1020). Upon receiving the RRC connection release message, the UE starts to operate in an RRC idle state. When transmitting the RRC connection release message, the cell 1 may include information related to suspension of application of autonomous priority handling and transmit the same. The information related to suspension of application of autonomous priority handling may be information indicating dedicated priority to be applied to the frequency by the cell 1. The information related to suspension of application of autonomous priority handling may be information indicating suspension of application of autonomous priority handling.

Meanwhile, upon receiving the information indicating dedicated priority and/or the information indicating suspension of application of autonomous priority handling from the cell 1, the UE determines that conditions for suspending application of autonomous priority handling are met, and suspends application of autonomous priority handling (S1030). When the conditions for suspending application of autonomous priority handling are met, the UE may initiate the suspend timer. The suspend timer may be set to a particular value previously set in the UE. Meanwhile, in a case in which suspension of application of autonomous priority handling has been signaled by the network, a pre-set value of the suspend timer may be included in a corresponding signaling message and transmitted. In the example illustrated in FIG. 10, information indicating a pre-set value of the suspend timer may be included in an RRC connection release message and transmitted.

The UE in an RRC idle state performs measurement to select a target cell for a cell re-selection (S1040) and performs cell re-selection to the selected target cell (S1050). Since application of autonomous priority handling has been suspended, the UE may determine a cell operated in a frequency having high common priority, as a target cell. Thus, the UE may determine the cell 2 operated with the frequency 2 as a target cell and perform cell re-selection.

When the suspend timer expires, the UE withdraws suspension of application of autonomous priority handling and resumes application of autonomous priority handling. Thus, the UE performs cell re-selection based on autonomous priority handling thereafter (S1060). Since cell 1, although operated with the frequency 1 having priority lower than that of frequency 2, provides an MBMS service, the UE may apply highest priority to the frequency 1 and perform cell re-selection. Thus, the UE may select the cell 1 as a target cell and perform cell re-selection.

According to an embodiment of the present invention, a network may control autonomous priority handling that may be a basis during a process of cell re-selection of a UE. Through this, the network may appropriately control whether to apply autonomous priority handling by the UE for the purpose of operation. Thus, a phenomenon in which accesses of UEs to a particular frequency are concentrated on a particular frequency or accesses of UEs are concentrated on a particular type of cell may be resolved, implementing network optimization.

Figure 11:
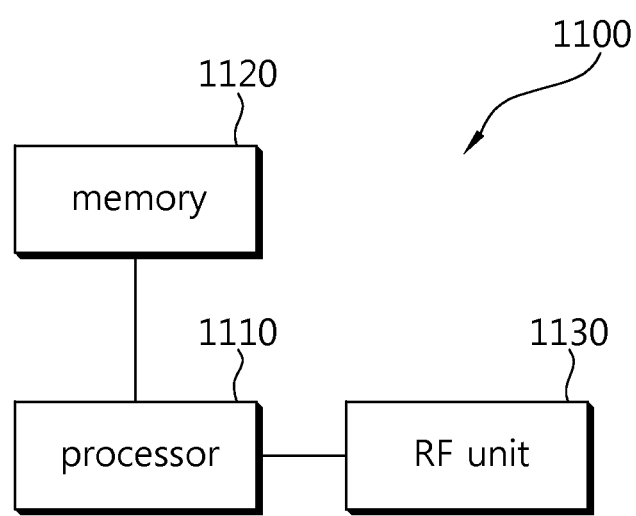
FIG. 11 is a block diagram illustrating a wireless device implementing an embodiment of the present invention.

FIG. 11 is a block diagram of a wireless device implementing an embodiment of the present invention. The device may implement an operation of the UE and/or a network performing the embodiment described above with reference to FIGS. 9 and 10.

The wireless device 1100 includes a processor 1110, a memory 1120, and an RF unit 1130. The processor 1110 implements the proposed function, process and/or method. The processor 1110 may be configured to perform cell selection/cell re-selection based on autonomous priority handling. The processor 1110 may be configured to determine whether to apply autonomous priority handling. The processor 1110 may be configured to control suspending/resuming application of autonomous priority handling through operation of the suspend timer. The processor 1110 may be configured to implement the embodiment described above with reference to FIGS. 9 and 10.

The RF unit 1130 may be connected to the processor 1110 to transmit and receive a radio signal.

The processor 1110 and the RF unit 1130 may be implemented to transmit and receive a radio signal according to one or more communication standards. The RF unit 1130 may include one or more transceivers to transmit and receive a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor.

The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for re-selecting a cell by a user equipment (UE) in a wireless communication system, the method comprising:
   determining whether conditions for suspending autonomous priority handling are satisfied based on information for suspending autonomous priority handling, wherein, during autonomous priority handling, the UE re-selects a cell based on frequency priority set by the UE in an idle state;
   re-selecting a cell based on frequency priority set by a network, while in the idle state and when the conditions for suspension are satisfied, wherein the frequency priority set by the network is different from the frequency priority set by the UE;
   initiating a suspend timer when the conditions for suspension are satisfied;
   determining whether conditions for resuming autonomous priority handling are satisfied after the suspend timer expires; and
   if the conditions for resuming autonomous priority handling are not satisfied, re-selecting a cell based on the frequency priority set by the network, while in the idle state; and
   if the conditions for resuming autonomous priority handling are satisfied, re-selecting a cell based on the frequency priority set by the UE,
   wherein the information for suspending autonomous priority handling includes an indication that the UE suspend autonomous priority handling, and wherein suspending autonomous priority handling relates to multimedia broadcast multicast service (MBMS) reception or closed subscriber group (CSG) cell re-selection.

2. The method of claim 1, wherein the determining of whether the conditions for suspending application of autonomous priority handling are met comprises:
   when a command for suspending autonomous priority handling is received from the network, determining that the conditions for suspension are met,
   wherein the command for suspending autonomous priority handling includes the information for suspending autonomous priority handling.

3. The method of claim 1, wherein the suspend timer is set to a pre-set value.

4. The method of claim 2, wherein the command for suspending application of autonomous priority handling includes suspension duration information, and the suspend timer is set to a value indicated by the suspension duration information.

5. The method of claim 1, wherein the determining of whether the conditions for suspending application of autonomous priority handling are met comprises:
   when dedicated priority is received from the network, it is determined that the conditions for suspension are met,
   wherein the frequency priority set by the network includes common priority broadcast by the network and dedicated priority, and
   wherein the dedicated priority includes the information for suspending autonomous priority handling.

6. The method of claim 5, further comprising:
   when the dedicated priority is received, initiating validity timer set to a time at which the dedicated priority is validly applied.

7. The method of claim 6, wherein the determining of whether the conditions for resuming application of autonomous priority handling are met comprises:
   when the suspend timer expires while the validity timer is being driven, determining that the conditions for resuming application of autonomous priority handling are met; and
   when the validity timer expires while the suspend timer is being driven, determining that the conditions for resuming application of autonomous priority handling are met.

8. The method of claim 1, wherein the cell re-selection is performed on a particular frequency, and
   wherein the particular frequency is a frequency in which a multimedia broadcast and multicast service (MBMS) that the UE wants to receive is provided, and the autonomous priority handling applies highest priority to the frequency in which the MBMS is provided.

9. The method of claim 1, wherein the cell re-selection is performed on a particular frequency, and
   wherein the particular frequency is a frequency operated by a closed subscriber group (CSG) cell to which the UE belongs as a member, and the autonomous priority handling applies highest priority to the frequency operated by the CSG cell.

10. A wireless device operating in a wireless communication system, the wireless device comprising:
    a transceiver configured to transmit and receive a radio signal; and
    a processor functionally coupled to the transceiver,
    wherein the processor is configured to:
    determine whether conditions for suspending autonomous priority handling are satisfied based on information for suspending autonomous priority handling, wherein, during autonomous priority handling, the processor is configured to re-select a cell based on frequency priority set by the processor in an idle state, and
    re-select a cell based on frequency priority set by a network, while in the idle state and when the conditions for suspension are satisfied, wherein the frequency priority set by the network is different from the frequency priority set by the UE,
    initiate a suspend timer when the conditions for suspension are satisfied,
    determine whether the conditions for resuming autonomous priority handling are satisfied after the suspend timer expires,
    re-select a cell based on the frequency priority set by the network, while in the idle state and when the conditions for resuming autonomous priority handling are not satisfied, and
    re-select a cell based on the frequency priority set by the processor when the conditions for resuming autonomous priority handling are satisfied, wherein the information for suspending autonomous priority handling includes an indication that the UE suspend autonomous priority handling, and wherein suspending autonomous priority handling relates to multimedia broadcast and multicast service (MBMS) reception or closed subscriber group (CSG) cell re-selection.

* * * * *